(No Model.) 3 Sheets—Sheet 1.

C. F. LEIGHTON & W. E. BAILEY.
HEEL BEADING MACHINE.

No. 433,796. Patented Aug. 5, 1890.

Witnesses:
Alice G. Perkins
S. P. Freeman

Inventors:
Carleton F. Leighton
and William E. Bailey
by their atty.

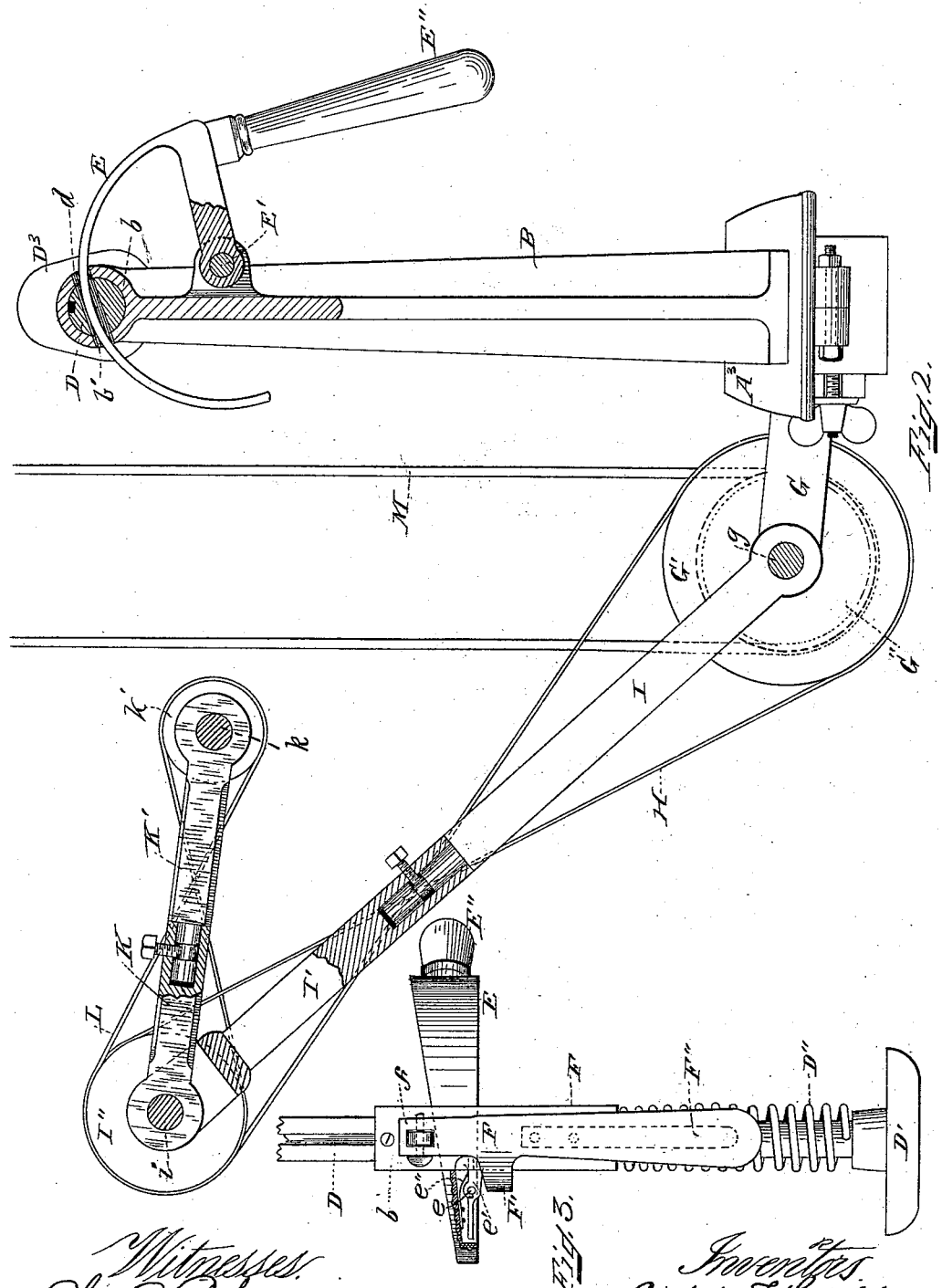

(No Model.)  3 Sheets—Sheet 3.

C. F. LEIGHTON & W. E. BAILEY.
HEEL BEADING MACHINE.

No. 433,796.  Patented Aug. 5, 1890.

Witnesses
Alice A. Perkins
S. P. Freeman

Inventors
Carleton F. Leighton
and William E. Bailey
by

UNITED STATES PATENT OFFICE.

CARLETON F. LEIGHTON AND WILLIAM E. BAILEY, OF BEVERLY, ASSIGNORS TO CHARLES S. HILL, OF SAME PLACE, AND FORREST D. GREENE, OF BOSTON, MASSACHUSETTS.

HEEL-BEADING MACHINE.

SPECIFICATION forming part of Letters Patent No. 433,796, dated August 5, 1890.

Application filed May 12, 1890. Serial No. 351,422. (No model.)

*To all whom it may concern:*

Be it known that we, CARLETON F. LEIGHTON and WILLIAM E. BAILEY, citizens of the United States, and residents of Beverly, in the county of Essex and State of Massachusetts, have jointly invented new and useful Improvements in Heel Beading and Randing Machines, of which the following, taken in connection with the accompanying drawings, is a specification.

This invention relates to improvements in heel beading and randing machines; and it consists, in combination with a heel-burnishing machine having an oscillating burnisher-tool and a shoe-holding jack, of a rotary beading or randing tool secured to a shaft journaled in a system of levers provided with a handle for guiding the rotary beading or randing tool in contact with the heel-surface to be beaded or randed while the shoe is held on the jack and rotated thereon, as will hereinafter be more fully shown and described, reference being had to the accompanying drawings, wherein—

Figure 1:
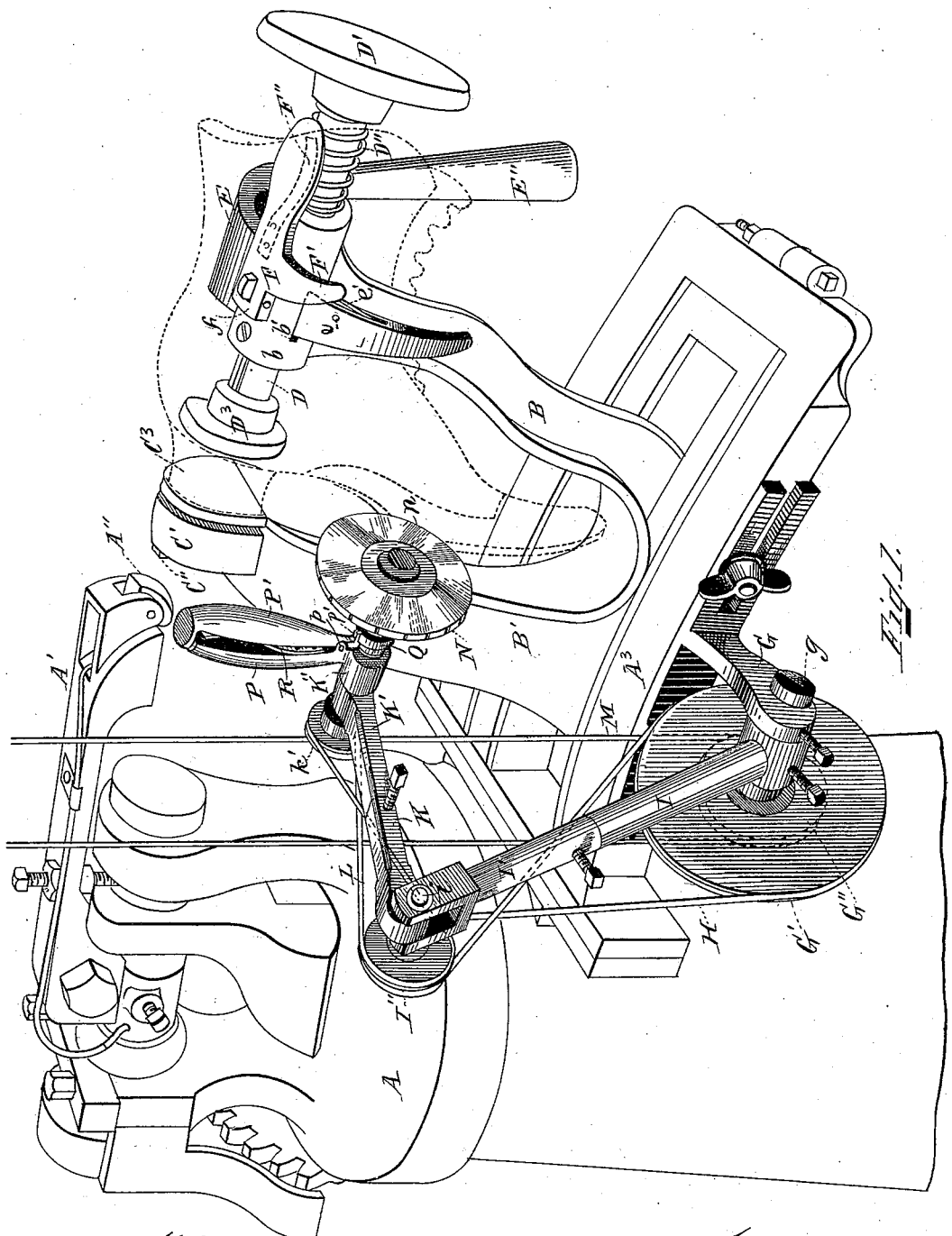
Figure 4:
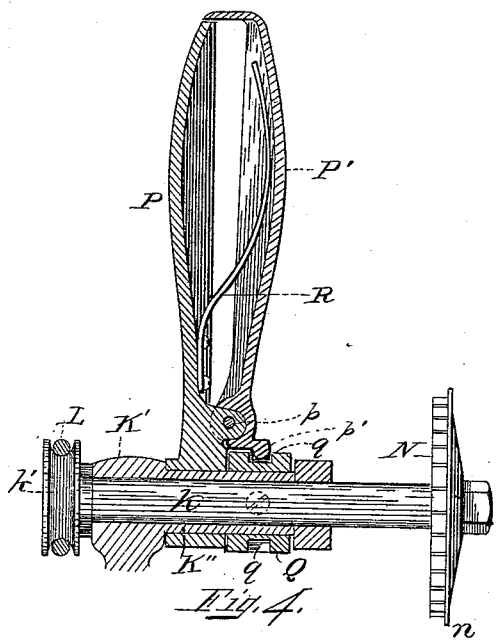
Figure 5:
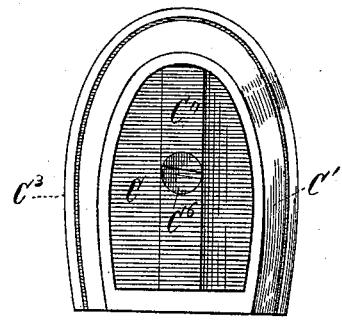
Figure 6:
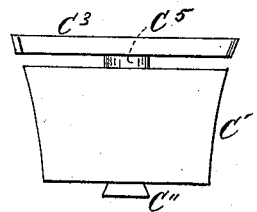
Figures 8, 9, 10:
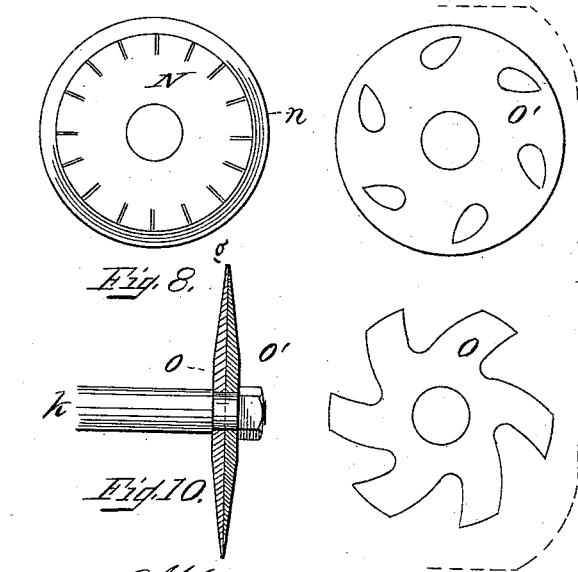
Figure 7:
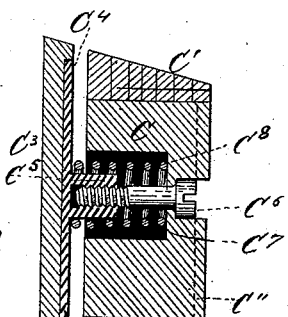

Figure 1 represents a perspective view of a heel-burnishing machine provided with our beading and randing attachment. Fig. 2 represents an end view of the jack and beading and randing attachment, parts of which are shown in section. Fig. 3 represents a detail plan view of the jack-spindle-actuating device, partly shown in section. Fig. 4 represents a detail sectional view of the beading and randing shaft and adjustable handle for guiding said shaft and tool. Fig. 5 represents a rear view of the improved top-lift rest that is detachably secured to the jack. Fig. 6 represents a top view of said top-lift rest, and Fig. 7 represents a cross-section on the line X X shown in Fig. 5. Fig. 8 represents an end view of the beading-tool. Fig. 9 represents a detail plan view of the two-part randing-tool, showing the parts as disconnected from each other, and Fig. 10 represents a cross-section of said randing-tool, showing the two parts thereof arranged in working position.

Similar letters refer to similar parts wherever they occur on the different parts of the drawings.

In Fig. 1, A represents an ordinary Tapley heel-burnishing machine having an oscillating arm A', to the forward end of which is suitably connected the burnishing-tool A'', as is common in machines of this kind. $A^3$ is a bracket or guide, as usual, in which the jack B B' is adjustable to and from the burnishing-tool A''. To the upper end of the rear jack-arm B' is detachably secured the improved top-lift rest, which is shown in detail in Figs. 5, 6, and 7. The said top-lift rest is composed of a metal block C, preferably surrounded by a leather surface C' and provided at its rear with a dovetailed rib or projection C'', adapted to be inserted in a correspondingly-shaped groove or recess in the upper end of the jack portion B'.

$C^3$ represents the top-lift plate, preferably made of leather and secured in a suitable manner to a metal backing-plate $C^4$, having on its rear side a screw-threaded hub $C^5$, into which is screwed the screw $C^6$, passing loosely through a perforation in the metal block C, and provided with an enlarged head at its rear end, as shown in Figs. 5 and 7.

$C^7$ is a recess in the front part of the metal block C, in which is located a coiled spring $C^8$, pressing against the bottom of said recess and the rear side of the metal backing-plate $C^4$, as shown in Fig. 7. By this arrangement two objects are obtained—namely, the top-lift plate $C^3$ and its metal backing $C^4$ may be forced by the jack-spindle and shoe held thereon against the stationary metal block C, so as to hold such parts firmly in contact during the operation of burnishing the heel of the boot or shoe, or the heel of the boot or shoe may be forced by the jack-spindle against the yielding top-lift plate sufficiently to force the latter backward against its spring $C^8$ without causing contact between the backing-plate $C^4$ and block C, when the shoe and the said top-lift rest $C^3$ may be turned freely around upon the jack-spindle during the operation of randing or beading the heel, as will hereinafter be more fully mentioned and described.

D is the jack-spindle, as usual, which is guided in a sleeve or bearing b in the upper end of the jack-arm B. D' is a knob or enlargement, as usual, on the forward end of said jack-spindle, and between it and the front end of the bearing $b$ is arranged a coiled spring D'', that surrounds the said jack-spindle, as is common in machines of this kind.

To the rear end of the jack-spindle D is loosely pivoted the shoe-rest $D^3$, adapted to be forced against the insole of the shoe above the heel during the operation of the machine. The jack-spindle is forced backward by means of the curved and tapering wedge E, pivoted at E' to the bearing $b$, as is usual in machines of this kind, said wedge being provided with a suitable handle E'' for its operation in the ordinary manner. The wedge E is made to project through a slotted perforation $d$ in the jack-spindle D, as well as through a transverse perforation $b'$ in the bearing $b$, in the ordinary manner.

For the purpose of locking the jack-spindle to the jack-bearing $b$ without forcing the top-lift plate $C^3$ $C^4$ against the stationary block C, we pivot at $e$, in a recess in the wedge E, a pawl $e'$, which is nominally forced outward by the agency of a suitable spring $e''$, (shown in Fig. 3,) so as to cause the wedge E to be locked to the bearing $b$ by said spring-pressed pawl being forced outside of the slot $b'$ and against the outside of the bearing $b$, as shown in Fig. 1.

If it is desired to withdraw the wedge E from the slots in the jack-spindle and its bearing, it is only necessary to press inward the pawl $e'$, and this is preferably done by means of a lever F, pivoted at $f$ to the bearing $b$ and provided with a cam-projection F', which when depressed comes in contact with the pawl $e'$ and presses the latter inward, so as to allow the wedge E to be withdrawn from the slotted perforations in the jack-spindle and its bearing whenever it is desired to release the shoe from the jack-spindle. The lever F is preferably held upward by the influence of a spring F''. (Shown in dotted lines in Fig. 1.)

The mechanism for randing or beading the shoe-heel at the junction of the upper is constructed as follows:

To the jack-guide $A^3$ is secured, preferably in an adjustable manner, a bracket G, in which is journaled a shaft $g$, to which is secured a pulley G', preferably grooved to receive a cord or belt H, as shown in Fig. 1. On said shaft $g$ is pivoted the lower end of a lever I, which is preferably swiveled in its upper end to a socketed extension I', as shown in Figs. 1 and 2. The upper end of the part I' is connected by means of a pivot-pin $i$ to the rear end of an arm or lever K, preferably swiveled to an extension K', as shown in Figs. 1 and 2.

$k$ is a spindle journaled in a bearing in the forward end of the arm or lever K', said spindle having secured to one of its ends a cord-pulley $k'$, from which leads a belt or cord L to a pulley I'' on the spindle $i$, and from said pulley I'' leads a cord or belt H to the pulley G' on the spindle $g$, as shown in Figs. 1 and 2. To the spindle $g$ is also secured a pulley G'', to which a rotary motion is imparted by means of a cord or belt M, leading, preferably, from a pulley on an overhead counter-shaft.

N in Figs. 1 and 8 represents the beading-tool, which is secured in a suitable manner to the forward end of the rotary spindle $k$. Said beading-tool is of the usual form and provided with an annular lip or flange $n$, adapted to be introduced into the groove at the junction of the heel and shoe-upper, as is usual in beading-machines.

For the purpose of randing the heel we use a rand-cutter O and a guide-plate O', having an annular lip $o$, as shown in Figs. 9 and 10, which cutter and guide-plate are secured face to face on the rotary spindle $k$ during the randing operation.

For the purpose of guiding the rotary randing or beading tools properly against the heel-surface at its junction with the shoe-upper, a handle P is arranged on the end of the arm or lever K', as shown in Figs. 1 and 4. Said handle may be secured to such lever; but in practice we prefer to pivot the hub of said handle on a tubular side extension K'' of the arm K', as shown in Fig. 4, on which the said handle may be oscillated, and for the purpose of limiting such rocking motion of the handle we prefer to pivot at $p$ to it a lock-plate P', having at its lower end a tooth or locking projection $p'$, adapted to be locked into one of the notches $q\,q$ on the collar Q, that is secured in a suitable manner to the sleeve K'', as shown in Figs. 1 and 4. A spring R, interposed between the handle P and its lock-plate P', serves to hold the projection $p'$ into one of the recesses $q$, as shown in Figs. 1 and 4, thus causing the handle to be held firmly for the time being in relation to the arm K' and its bearing-sleeve K''. This manner of adjusting and securing the handle P to the arm K' is very useful where a double burnishing-machine is used twin fashion—that is, one at the side of the other—as in such case the arm K K' may be swung outward about half a revolution on the spindle $i$ and the handle P secured in a corresponding position relative to the arm or lever K K', for the purpose of using and operating a single randing and beading mechanism in connection with a pair of burnishing-machines.

By having the arms I I' and K K' swiveled together, as described, the randing or beading tools may be guided with the utmost ease and freedom of adjustment relative to the shape and curvature of the heel that is to be randed or beaded.

The operation of the machine is as follows: In burnishing a heel the shoe is clamped firmly between the top-lift rest and the block $D^3$ on the jack-spindle D, causing the top-lift plate $C^3$ to be forced firmly against the stationary metal block C, by which the shoe is caused to be held rigidly in the jack, after which the latter and the shoe held thereon is moved inward sufficiently to bring the heel to be burnished directly below the burnisher-tool A″, which is set in oscillating motion, as usual, causing it to rub against the curved heel-surface from breast to breast, as is usual in burnishing-machines of this kind, and during such operation the jack is moved forward and so as to bring all parts of the heel in contact with the oscillating burnisher-tool.

In randing or beading the heel the shoe is clamped less firmly between the pivoted jack-spindle block D³ and yielding top-lift-rest plate C³ and held in such position by the wedge E and locking-pawl e′, as shown in Fig. 1, in which position the shoe and the spindle-block D³ and top-lift-rest plate C³ may be rotated together on a line axial with the center of the jack-spindle, and while the shoe is being turned or rocked by the operator he takes hold of the handle P and guides the rotary randing or beading tool with a proper pressure against the heel at its junction with the upper until the randing or beading operation is completed, and so on.

It will thus be seen that by this our invention the burnishing, beading, and randing of boot and shoe heels can be done on a single machine without the need of special machines for each operation, and the utility of and capacity of work on the machine is thus materially increased.

Having thus fully described the nature, construction, and operation of our invention, we wish to secure by Letters Patent and claim—

1. A burnishing and beading or randing machine consisting of a burnishing-tool, a horizontal guide-bracket, a shoe-holding jack sliding on the guide-bracket to and from the burnishing-tool, a bracket secured to one side of the guide-bracket and having a shaft, an oscillating lever pivotally supported at its lower end by said shaft and moving in a plane approximately at right angles to the line of movement of the jack, and a vertically-swinging arm pivoted to the upper end of the oscillating lever and having at its inner end a handle and a heel beading or randing tool, substantially as described.

2. The jack-spindle pressure device consisting of a jack-spindle adapted to slide forward and back in a jack sleeve or bearing and having a spring for releasing it, combined with a wedge-shaped pressure-lever having a spring-pressed locking-pawl, and a pawl-releasing lever pivoted to the jack and having a cam or projection for engagement with the locking-pawl, substantially as and for the purpose set forth.

3. A burnishing and beading or randing machine consisting of a burnishing-tool, a horizontal guide, a shoe-holding jack sliding on the guide, a bracket secured to one side of the guide and having a rotary shaft carrying a driven pulley, an oscillating lever pivotally supported at its lower end by the rotary shaft and swinging in a plane approximately at right angles to the line of movement of the jack, a vertically-swinging arm pivoted to the upper end of the oscillating lever and carrying at its inner end a handle and a rotary shaft provided with a beading or randing tool, and belting between the said tool-carrying shaft and said driven pulley, substantially as described.

4. In a randing or beading machine, the pivoted arm K and rotary randing or beading tool carrying spindle journaled in said arm, combined with a handle pivoted on said arm and having a spring-actuated pivoted shield or lever, a locking projection thereon, and a notched or recessed locking-plate secured to the arm K, for the purpose of securing said handle in various positions to said arm, substantially as and for the purpose set forth.

In testimony whereof we have signed our names to this specification, in the presence of two subscribing witnesses, on this 9th day of May, A. D. 1890.

CARLETON F. LEIGHTON.
WILLIAM E. BAILEY.

Witnesses:
ALBAN ANDRÉN,
MARY C. TORREY.